United States Patent
Kichise (10) Patent No.: US 11,187,556 B2
(45) Date of Patent: Nov. 30, 2021

(54) ROTATIONAL ANGLE DETECTION DEVICE

(71) Applicant: JTEKT CORPORATION, Osaka (JP)

(72) Inventor: Hiroshi Kichise, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 87 days.

(21) Appl. No.: 16/728,695

(22) Filed: Dec. 27, 2019

(65) Prior Publication Data

US 2020/0232817 A1   Jul. 23, 2020

(30) Foreign Application Priority Data

Jan. 18, 2019  (JP) .............................. JP2019-006961

(51) Int. Cl.
| | | |
|---|---|---|
| *G01D 5/14* | (2006.01) | |
| *B62D 15/02* | (2006.01) | |
| *G01B 7/30* | (2006.01) | |
| *G01D 5/04* | (2006.01) | |

(52) U.S. Cl.
CPC ............ *G01D 5/145* (2013.01); *B62D 15/021* (2013.01); *G01B 7/30* (2013.01); *G01D 5/04* (2013.01)

(58) Field of Classification Search
CPC ......... G01D 5/145; G01B 7/30; B62D 15/021
See application file for complete search history.

(56) References Cited

U.S. PATENT DOCUMENTS

| | | | | |
|---|---|---|---|---|
| 4,931,949 A | * | 6/1990 | Hernandez | G01M 13/021 340/683 |
| 5,930,905 A | | 8/1999 | Zabler et al. | |
| 6,412,607 B2 | * | 7/2002 | Ohba | F16D 65/183 188/196 B |
| 10,112,444 B2 | * | 10/2018 | Takahashi | G01M 17/02 |

FOREIGN PATENT DOCUMENTS

JP     H11-500828 A    1/1999

* cited by examiner

*Primary Examiner* — Reena Aurora
(74) *Attorney, Agent, or Firm* — Oliff PLC (57) ABSTRACT

A rotational angle detection device includes: a main driving gear; two driven gears; two sensors that detect the respective rotational angles of the two driven gears; and a computation circuit configured to compute the rotational angle of the main driving gear based on the respective rotational angles of the two driven gears. The computation circuit includes a difference computation circuit and a wear detection circuit. The difference computation circuit is configured to compute a first difference. The wear detection circuit is configured to detect wear of the two driven gears through a comparison between a value of the first difference that is computed by the difference computation circuit and a first ideal value.

4 Claims, 7 Drawing Sheets

| CLASSIFICATION NUMBER TN | ALLOWABLE RANGE OF DIFFERENCE $\Delta\alpha\beta$ | IDEAL VALUE OF DIFFERENCE $\Delta\alpha\beta$ | NUMBER OF CYCLES $\gamma_1$ |
|---|---|---|---|
| 1 | $-4320\pm\varepsilon$ | $-4320$ | 0 |
| 2 | $-3960\pm\varepsilon$ | $-3960$ | $-1$ |
| 3 | $-3600\pm\varepsilon$ | $-3600$ | $-2$ |
| 4 | $-3240\pm\varepsilon$ | $-3240$ | $-3$ |
| 5 | $-2880\pm\varepsilon$ | $-2880$ | $-4$ |
| 6 | $-2520\pm\varepsilon$ | $-2520$ | $-5$ |
| 7 | $-2160\pm\varepsilon$ | $-2160$ | $-6$ |
| 8 | $-1800\pm\varepsilon$ | $-1800$ | 5 |
| 9 | $-1440\pm\varepsilon$ | $-1440$ | 4 |
| 10 | $-1080\pm\varepsilon$ | $-1080$ | 3 |
| 11 | $-720\pm\varepsilon$ | $-720$ | 2 |
| 12 | $-360\pm\varepsilon$ | $-360$ | 1 |
| 13 | $0\pm\varepsilon$ | 0 | 0 |
| 14 | $360\pm\varepsilon$ | 360 | $-1$ |
| 15 | $720\pm\varepsilon$ | 720 | $-2$ |
| 16 | $1080\pm\varepsilon$ | 1080 | $-3$ |
| 17 | $1440\pm\varepsilon$ | 1440 | $-4$ |
| 18 | $1800\pm\varepsilon$ | 1800 | $-5$ |
| 19 | $2160\pm\varepsilon$ | 2160 | $-6$ |
| 20 | $2520\pm\varepsilon$ | 2520 | 5 |
| 21 | $2880\pm\varepsilon$ | 2880 | 4 |
| 22 | $3240\pm\varepsilon$ | 3240 | 3 |
| 23 | $3600\pm\varepsilon$ | 3600 | 2 |
| 24 | $3960\pm\varepsilon$ | 3960 | 1 |
| 25 | $4320\pm\varepsilon$ | 4320 | 0 |
| 26 | $4680\pm\varepsilon$ | 4680 | $-1$ |
| 27 | $5040\pm\varepsilon$ | 5040 | $-2$ |

ROTATIONAL ANGLE DETECTION DEVICE

INCORPORATION BY REFERENCE

The disclosure of Japanese Patent Application No. 2019-006961 filed on Jan. 18, 2019 including the specification, drawings and abstract is incorporated herein by reference in its entirety.

BACKGROUND

1. Technical Field

The present disclosure relates to a rotational angle detection device.

2. Description of Related Art

Japanese Unexamined Patent Application Publication (Translation of PCT Application) No. 11-500828 (JP 11-500828 A), for example, describes a rotational angle detection device that includes a main driving gear that rotates together with a shaft and two driven gears meshed with the main driving gear. The two driven gears have different numbers of teeth, and therefore make different rotational angles along with rotation of the main driving gear. The rotational angle detection device detects the rotational angles of the two driven gears through sensors provided in correspondence with the two driven gears, and computes the rotational angle of the main driving gear based on the detected rotational angles.

SUMMARY

In the rotational angle detection device according to JP 11-500828 A, the teeth of the driven gears may be worn over years along with normal use. Since the rotational angle detection device computes the rotational angle of the main driving gear based on the rotational angles of the driven gears, the precision in computing the rotational angles of the driven gears, hence the rotational angle of the main driving gear, may be lowered because of wear of the driven gears.

The present disclosure allows detection of wear of driven gears.

An aspect of the present disclosure provides a rotational angle detection device. The rotational angle detection device includes: a main driving gear configured to rotate together with a rotation detection target in an integrated manner; two driven gears that have different numbers of teeth and mesh with the main driving gear; two sensors configured to detect respective rotational angles of the two driven gears; and a computation circuit configured to compute a rotational angle of the main driving gear based on the respective rotational angles of the two driven gears that are detected through the two sensors. The computation circuit includes a difference computation circuit and a wear detection circuit. The difference computation circuit is configured to compute a first difference. The first difference is a difference between the respective rotational angles of the two driven gears that are detected through the two sensors. The wear detection circuit is configured to detect wear of the two driven gears through a comparison between a value of the first difference that is computed by the difference computation circuit and a first ideal value. The first ideal value is an ideal difference between the respective rotational angles of the two driven gears that are detected through the two sensors.

In the case where wear of the two driven gears progresses, an error due to the wear is caused in the respective rotational angles of the two driven gears that are detected through the two sensors. In this case, an error that corresponds to the degree of the wear of the two driven gears is caused also in the value of the difference between the respective rotational angles of the two driven gears. Thus, with the configuration described above, wear of the two driven gears can be detected through a comparison between the difference between the respective rotational angles of the two driven gears that are detected through the two sensors and the first ideal value that is an ideal difference between the respective rotational angles of the two driven gears that are detected through the two sensors.

In the rotational angle detection device described above, the wear detection circuit may be configured to detect that the two driven gears are worn when the value of the first difference that is computed by the difference computation circuit is a value outside an allowable range determined with reference to the first ideal value.

With the configuration described above, excessive determination of wear of the two driven gears is suppressed. In the case where wear of the driven gears is determined simply based on a comparison between the difference between the respective rotational angles of the two driven gears and an ideal value that is an ideal difference between the respective rotational angles of the two driven gears, the following concern arises. That is, the value of the difference between the respective rotational angles of the two driven gears may be different from the ideal value because of the dimensional tolerance of the two driven gears, and wear of the driven gears may be determined even in such cases. In addition, it is also conceivable that the degree of the wear of the driven gears is allowable in accordance with the product specifications etc. Therefore, in the configuration described above, it is preferable that wear of the driven gears be determined based on whether or not the value of the difference between the respective rotational angles of the two driven gears is a value within the allowable range that is determined with reference to the ideal value of the difference.

In the rotational angle detection device described above, the computation circuit may include a slope adjustment circuit that adjusts a first slope and a second slope to have the same slope. The first slope may be an proportion of an amount of variation in the rotational angle of one of the two driven gears with respect to an amount of variation in the rotational angle of the main driving gear. The second slope may be an proportion of an amount of variation in the rotational angle of the other of the two driven gears with respect to the amount of variation in the rotational angle of the main driving gear. The difference computation circuit may be configured to compute a second difference. The second difference may be a difference between the respective rotational angles of the two driven gears after slope adjustment by the slope adjustment circuit. The wear detection circuit may be configured to detect wear of the two driven gears through a comparison between a value of the second difference that is computed by the difference computation circuit and a second ideal value. The second ideal value may be an ideal difference between the respective rotational angles of the two driven gears after slope adjustment by the slope adjustment circuit.

With the configuration described above, the value of the difference between the respective rotational angles of the two driven gears after slope adjustment by the slope adjustment circuit is specific to the rotational angle of the main driving gear for each cycle in which the respective rotational angles of the two driven gears after slope adjustment repeatedly rise and fall with respect to variations in the rotational angle of the main driving gear. In addition, the value of the difference between the respective rotational angles of the two driven gears after slope adjustment varies in a form similar to a rectangular wave with respect to variations in the rotational angle of the main driving gear. Therefore, the wear detection circuit can easily recognize the value of the difference between the respective rotational angles of the two driven gears after slope adjustment as a pattern, and hence can easily make a comparison between the value of the difference between the respective rotational angles of the two driven gears after slope adjustment and an ideal value of the difference. Thus, the value of the difference between the respective rotational angles of the two driven gears after slope adjustment is suitable for use to detect wear of the two driven gears.

In the rotational angle detection device described above, the main driving gear and the two driven gears may be made of a synthetic resin. With the configuration described above, the two driven gears are easily worn, while generation of an abnormal sound during meshing of the gears can be suppressed. Thus, it is especially required to detect wear of the two driven gears.

In the rotational angle detection device described above, the rotation detection target may be a steering shaft or a pinion shaft in a steering device of a vehicle.

With the rotational angle detection device according to the present disclosure, wear of driven gears can be detected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
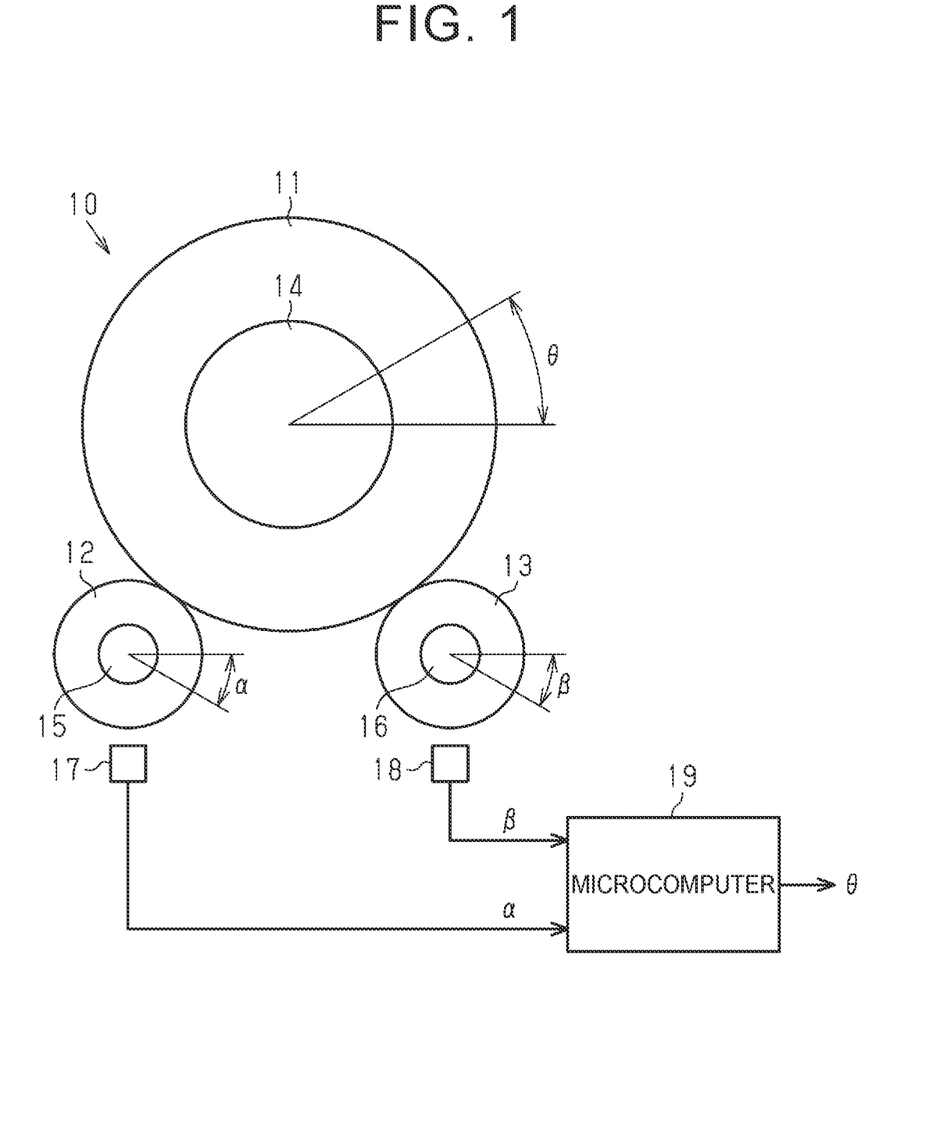
FIG. 1 is a block diagram illustrating a schematic configuration of a rotational angle detection device according to an embodiment.

A rotational angle detection device according to an embodiment will be described below. As illustrated in FIG. 1, a rotational angle detection device 10 has a main driving gear 11, a first driven gear 12, and a second driven gear 13. The main driving gear 11, the first driven gear 12, and the second driven gear 13 are formed from a synthetic resin material. The main driving gear 11 is fitted with a shaft 14 as the detection target so as to be rotatable together. The first driven gear 12 and the second driven gear 13 are meshed with the main driving gear 11. The number of teeth of the first driven gear 12 and the number of teeth of the second driven gear 13 are different from each other. Therefore, in the case where the main driving gear 11 is rotated in conjunction with rotation of the shaft 14, a rotational angle α of the first driven gear 12 and a rotational angle β of the second driven gear 13 with respect to a rotational angle θ of the main driving gear 11 are different from each other. For example, in the case where the number of teeth of the main driving gear 11 is "z", the number of teeth of the first driven gear 12 is "m", and the number of teeth of the second driven gear 13 is "n", the first driven gear 12 makes "z/m" rotations and the second driven gear 13 makes "z/n" rotations when the main driving gear 11 makes one rotation.

The rotational angle detection device 10 also has a first magnet 15, a second magnet 16, a first magnetic sensor 17, a second magnetic sensor 18, and a microcomputer 19. The first magnet 15 is provided so as to be rotatable together with the first driven gear 12. The second magnet 16 is provided so as to be rotatable together with the second driven gear 13. The first magnetic sensor 17 is provided in the vicinity of the first magnet 15, and detects a magnetic field generated from the first magnet 15. The second magnetic sensor 18 is provided in the vicinity of the second magnet 16, and detects a magnetic field generated from the second magnet 16.

The first magnetic sensor 17 and the second magnetic sensor 18 may be an MR sensor in which four magnetoresistance elements are connected in a bridge configuration, for example. The resistance value of the magnetoresistance elements is varied in accordance with the direction of a given magnetic field. The first magnetic sensor 17 detects the rotational angle α of the first driven gear 12 based on variations in the direction of magnetic flux generated from the first magnet 15. The second magnetic sensor 18 detects the rotational angle β of the second driven gear 13 based on variations in the direction of magnetic flux generated from the second magnet 16. A specific example will be described below.

The first magnetic sensor 17 generates a first sine signal and a first cosine signal that are two analog signals that continuously vary in accordance with the rotational angle α of the first driven gear 12. The first sine signal and the first cosine signal make one cycle when the first driven gear 12 is rotated by a detection range Ω of the first magnetic sensor 17, that is, when the main driving gear 11 is rotated by "(m/z)Ω". The phase of the first cosine signal is shifted by ¼ of a cycle with respect to the first sine signal. The first magnetic sensor 17 calculates the rotational angle α of the first driven gear 12 in the detection range (one cycle) Ω of the first magnetic sensor 17 by computing the arc tangent based on the first sine signal and the first cosine signal.

The second magnetic sensor 18 generates a second sine signal and a second cosine signal that are two analog signals that continuously vary in accordance with the rotational angle β of the second driven gear 13. The second sine signal and the second cosine signal make one cycle when the second driven gear 13 is rotated by the detection range Ω of the second magnetic sensor 18, that is, when the main driving gear 11 is rotated by "(n/z)Ω". The phase of the second cosine signal is shifted by ¼ of a cycle with respect to the second sine signal. The second magnetic sensor 18 calculates the rotational angle β of the second driven gear 13 in the detection range (one cycle) Ω of the second magnetic sensor 18 by computing the arc tangent based on the second sine signal and the second cosine signal.

Figure 3:
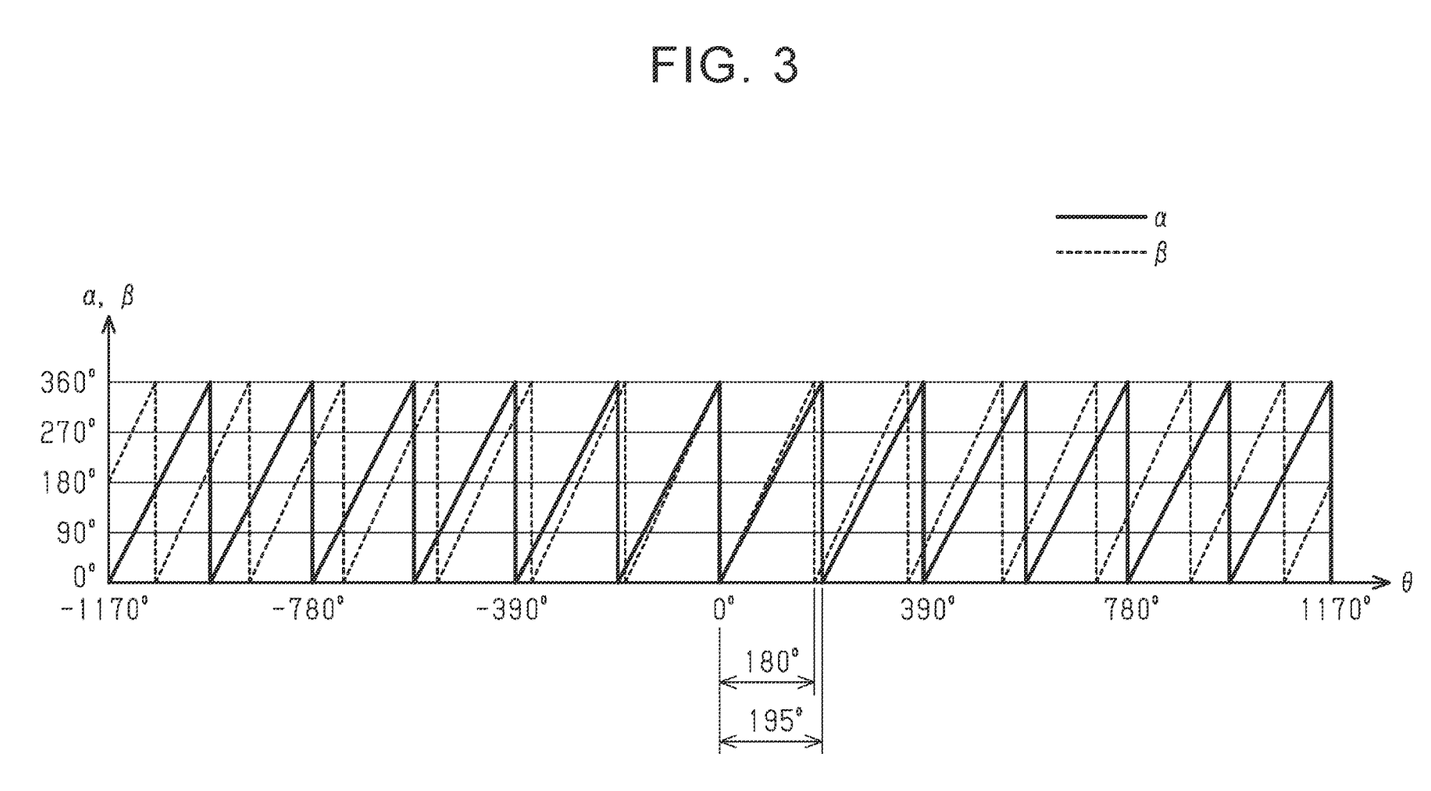
FIG. 3 is a graph indicating the relationship between the rotational angle of a first driven gear and the rotational angle of a main driving gear and the relationship between the rotational angle of a second driven gear and the rotational angle of the main driving gear according to the embodiment.

The rotational angle α of the first driven gear 12 and the rotational angle β of the second driven gear 13 are varied with respect to variations in the rotational angle θ of the main driving gear 11 as indicated in the graph in FIG. 3. In the graph in FIG. 3, the horizontal axis indicates the rotational angle θ of the main driving gear 11. In the graph in FIG. 3, in addition, the vertical axis indicates the rotational angle α of the first driven gear 12 and the rotational angle β of the second driven gear 13.

As indicated in the graph in FIG. 3, the rotational angle α of the first driven gear 12 repeatedly rises and falls in predetermined cycles in accordance with the number of teeth m along with variations in the rotational angle θ of the main driving gear 11. Specifically, the rotational angle α repeatedly rises and falls each time the first driven gear 12 is rotated by the detection range Ω of the first magnetic sensor 17, or in other words, each time the main driving gear 11 is rotated by "mΩ/z". Meanwhile, the rotational angle β of the second driven gear 13 repeatedly rises and falls in predetermined cycles in accordance with the number of teeth n of the second driven gear 13. Specifically, the rotational angle β repeatedly rises and falls each time the second driven gear 13 is rotated by the detection range Ω of the second magnetic sensor 18, or in other words, each time the main driving gear 11 is rotated by "nΩ/z".

Here, by way of example, a consideration is made for a case where the number of teeth z of the main driving gear 11 is "48", the number of teeth m of the first driven gear 12 is "26", the number of teeth n of the second driven gear 13 is "24", and the detection range Ω of the first magnetic sensor 17 and the second magnetic sensor 18 is 360°. In this case, the rotational angle α of the first driven gear 12 repeatedly rises and falls each time the main driving gear 11 is rotated by 195°. Meanwhile, the rotational angle β of the second driven gear 13 repeatedly rises and falls each time the main driving gear 11 is rotated by 180°.

The phase difference between the rotational angle α of the first driven gear 12 and the rotational angle β of the second driven gear 13 in the detection range Ω of the first magnetic sensor 17 and the second magnetic sensor 18 is eliminated when the rotational angle θ of the main driving gear 11 reaches a predetermined value. Therefore, the computation range (range in which the rotational angle θ can be computed) of the rotational angle θ of the main driving gear 11 for multiple rotations exceeding 360° is determined in accordance with the ratio among the number of teeth m of the first driven gear 12, the number of teeth n of the second driven gear 13, and the number of teeth z of the main driving gear 11. A computation range Ra of the rotational angle θ of the main driving gear 11 is represented by the following formula (1), for example.

$$Ra = mn\Omega/z(m-n) \quad (1)$$

In the formula, "m" is the number of teeth of the first driven gear 12, "n" is the number of teeth of the second driven gear 13, and "z" is the number of teeth of the main driving gear 11. In addition, "Ω" is the detection range of the first magnetic sensor 17 and the second magnetic sensor 18.

In the case where the number of teeth z of the main driving gear 11 is "48", the number of teeth m of the first driven gear 12 is "26", the number of teeth n of the second driven gear 13 is "24", and the detection range Ω of the first magnetic sensor 17 and the second magnetic sensor 18 is 360° as described earlier, the computation range of the rotational angle θ of the main driving gear 11 is 2340°.

In the graph in FIG. 3, the middle point of the computation range Ra of the rotational angle θ of the main driving gear 11 is defined as the origin (rotational angle θ=0°). Since the computation range Ra of the rotational angle θ of the main driving gear 11 is 2340°, the upper limit value and the lower limit value of the computation range Ra are +1170° and −1170°, respectively. That is, in this example, the absolute value of the rotational angle θ of the main driving gear 11 can be computed in the range of "−1170° to +1170°". The computation range Ra corresponds to 6.5 rotations (±3.25 rotations) of the shaft 14. In addition, the rotational angle θ of the main driving gear 11 is increased in the plus direction when the shaft 14 is rotated forward with respect to 0° as the origin, and increased in the minus direction when the shaft 14 is rotated in reverse.

The microcomputer 19 calculates the absolute value of the rotational angle θ of the main driving gear 11, and hence the shaft 14, for multiple rotations exceeding 360° using the rotational angle α of the first driven gear 12 and the rotational angle β of the second driven gear 13 that are detected by the first magnetic sensor 17 and the second magnetic sensor 18, respectively.

Figure 2:
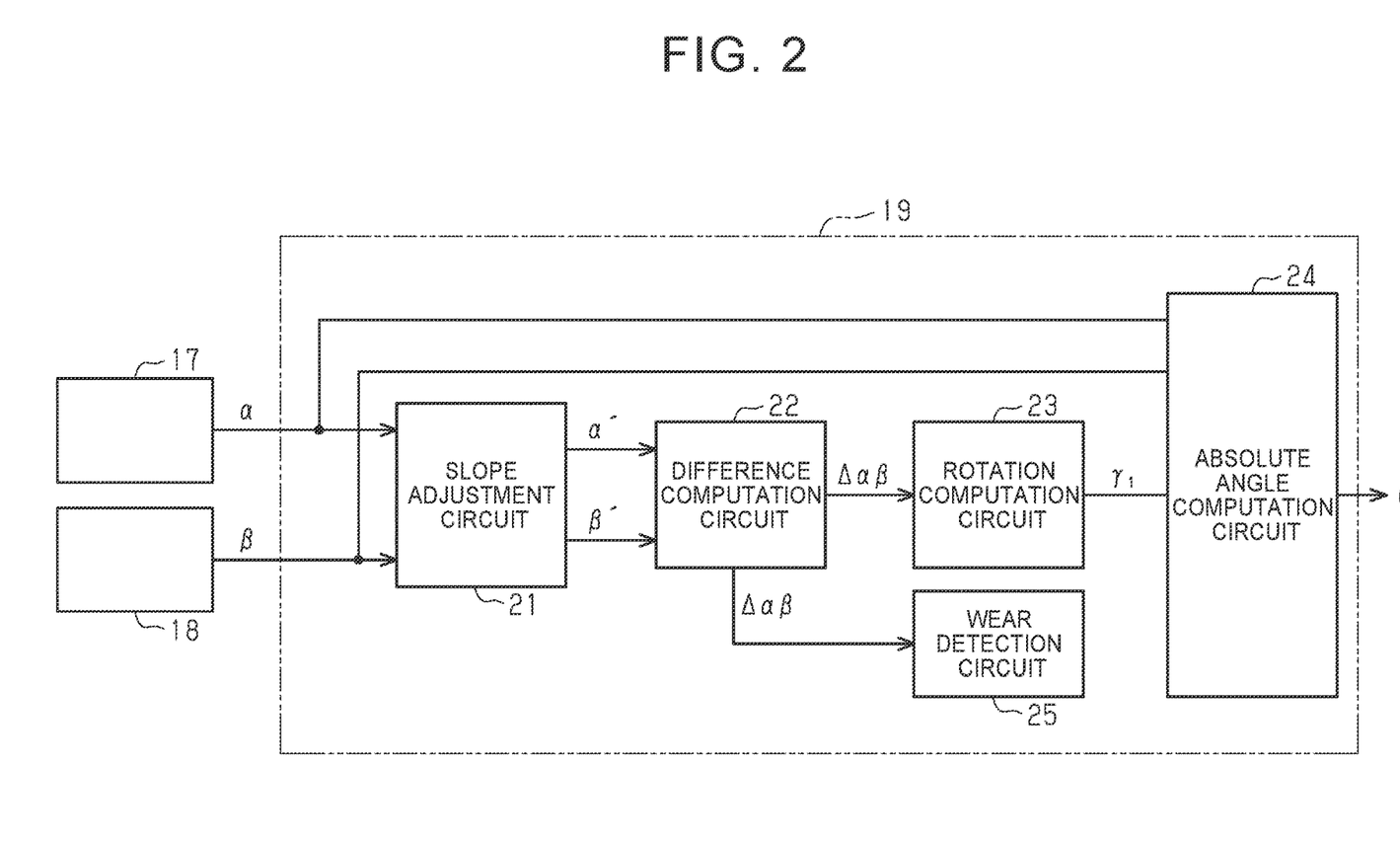
FIG. 2 is a block diagram of a microcomputer according to the embodiment.

Next, the configuration of the microcomputer will be described in detail. As illustrated in FIG. 2, the microcomputer 19 has a slope adjustment circuit 21, a difference computation circuit 22, a rotation computation circuit 23, an absolute angle computation circuit 24, and a wear detection circuit 25.

The slope adjustment circuit 21 adjusts a first slope, which is the proportion of the amount of variation in the rotational angle α of the first driven gear 12 to the amount of variation in the rotational angle θ of the main driving gear 11, and a second slope, which is the proportion of the amount of variation in the rotational angle β to the amount of variation in the rotational angle θ of the main driving gear 11, such that the slopes have the same value as each other.

Figure 4:
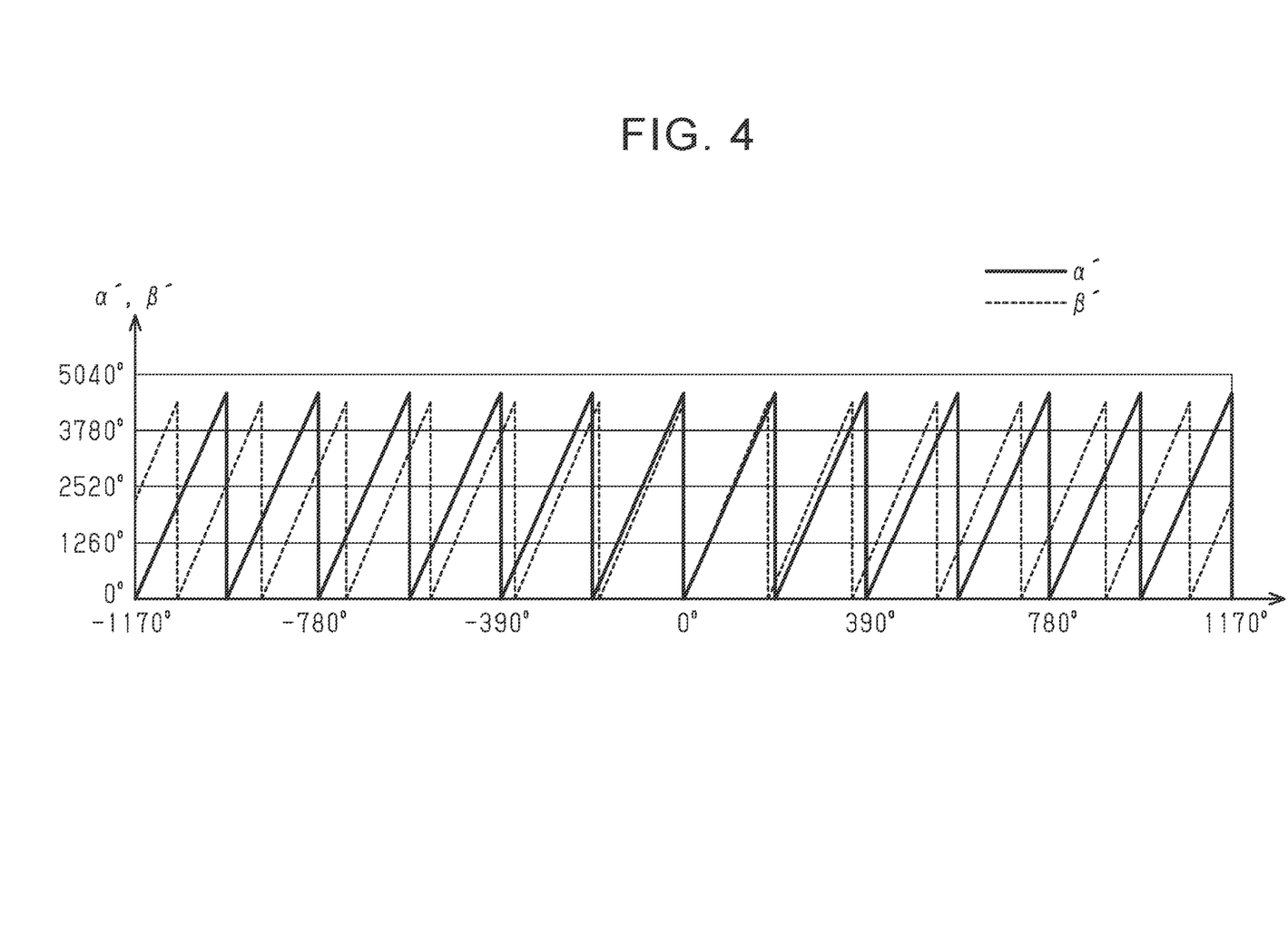
FIG. 4 is a graph indicating the relationship between the rotational angle of the first driven gear after slope adjustment and the rotational angle of the main driving gear and the relationship between the rotational angle of the second driven gear after slope adjustment and the rotational angle of the main driving gear according to the embodiment.

As indicated in the graph in FIG. 4, the slope of a first waveform that indicates the proportion of variations in a rotational angle α' of the first driven gear 12 after slope adjustment with respect to variations in the rotational angle θ of the main driving gear 11 and the slope of a second waveform that indicates the proportion of variations in a rotational angle β' of the second driven gear 13 after slope adjustment with respect to variations in the rotational angle θ of the main driving gear 11 are parallel to each other.

The difference computation circuit 22 computes a difference Δαβ between the rotational angle α' of the first driven gear 12 and the rotational angle β' of the second driven gear 13 after slope adjustment by the slope adjustment circuit 21. The relationship between the rotational angle θ of the main driving gear 11 and the difference Δαβ is as follows.

Figure 5:
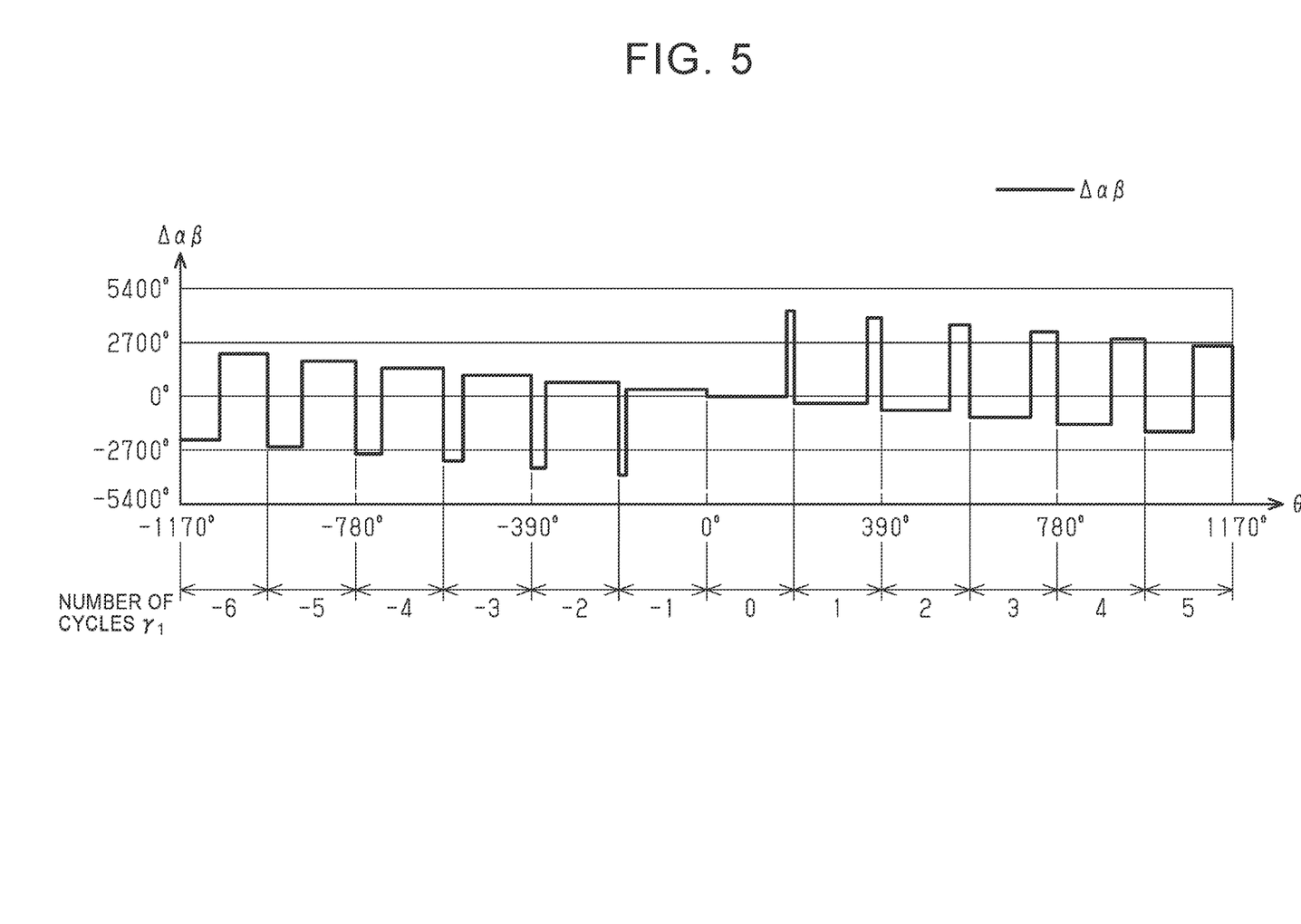
FIG. 5 is a graph indicating the relationship between the difference between the rotational angle of the first driven gear after slope adjustment and the rotational angle of the second driven gear after slope adjustment and the rotational angle of the main driving gear according to the embodiment.

As indicated in the graph in FIG. 5, the value of the difference Δαβ is specific to the rotational angle θ of the main driving gear 11 for each cycle in which the rotational angle α of the first driven gear 12 or the rotational angle α' of the first driven gear 12 after slope adjustment by the slope adjustment circuit 21 repeatedly rises and falls. That is, the value of the difference $\Delta\alpha\beta$ is specific to the number of cycles of the rotational angle $\alpha$ of the first driven gear 12 or the rotational angle $\alpha'$ of the first driven gear 12 after slope adjustment by the slope adjustment circuit 21.

In addition, the value of the difference $\Delta\alpha\beta$ is specific to the rotational angle $\theta$ of the main driving gear 11 for each cycle in which the rotational angle $\beta$ of the second driven gear 13 or the rotational angle $\beta'$ of the second driven gear 13 after slope adjustment by the slope adjustment circuit 21 repeatedly rises and falls. That is, the value of the difference $\Delta\alpha\beta$ is specific to the number of cycles of the rotational angle $\beta$ of the second driven gear 13 or the rotational angle $\beta'$ of the second driven gear 13 after slope adjustment by the slope adjustment circuit 21.

The rotation computation circuit 23 computes a number of cycles $\gamma_1$ of the first driven gear 12 based on the difference $\Delta\alpha\beta$ that is computed by the difference computation circuit 22. The number of cycles $\gamma_1$ is an integer value that indicates what cycle the first sine signal and the first cosine signal generated by the first magnetic sensor 17 are in, that is, how many times the detection range (one cycle) of the first magnetic sensor 17 has been repeated.

Figure 8:
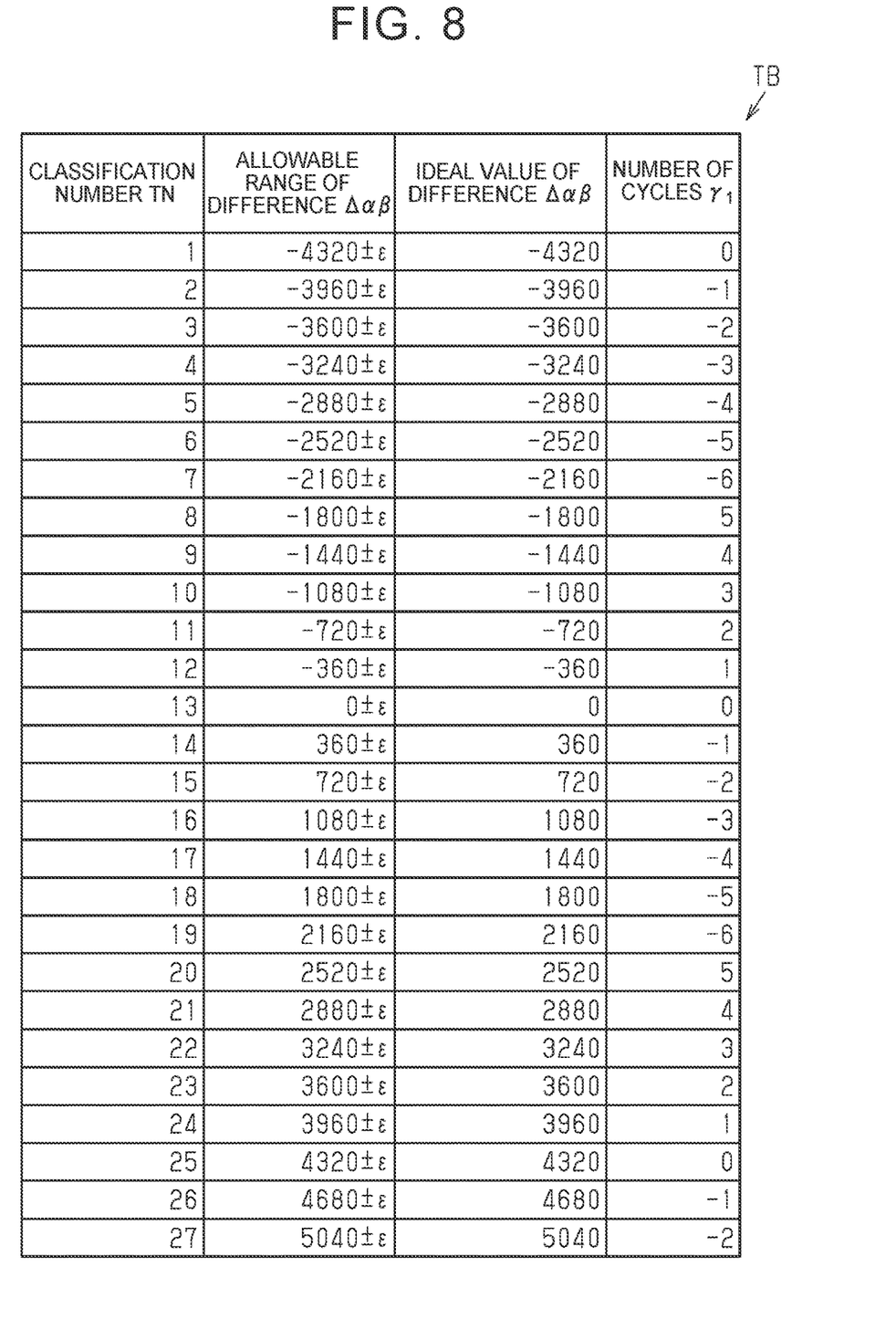
FIG. 8 is a table for use to compute the rotational angle of the main driving gear according to the embodiment.

The rotation computation circuit 23 computes the number of cycles $\gamma_1$ of the first driven gear 12 with reference to a table stored in a storage device (not illustrated). As indicated in FIG. 8, a table TB prescribes the relationship among three items, namely an allowable range, to be described later, of the value of the difference $\Delta\alpha\beta$ between the rotational angle $\alpha'$ and the rotational angle $\beta'$ after slope adjustment, an ideal value of the difference $\Delta\alpha\beta$, and the number of cycles $\gamma_1$ of the first driven gear 12. In the example in FIG. 8, as indicated by classification numbers TN1 to TN27, the three items described earlier are prescribed for each 360°, which is the detection range of the first magnetic sensor 17, over the entire computation range of the rotational angle $\theta$ of the main driving gear 11.

In reality, however, a table in which the three items described earlier are distributed to the classification numbers TN1 to TN27 for each minimum detection angle (e.g. 2°) of the rotational angle $\alpha$ of the first driven gear 12 that is determined in accordance with the resolution of the first magnetic sensor 17, the number of teeth m of the first driven gear 12, etc., is adopted as the table TB.

The rotation computation circuit 23 determines one of the classification numbers TN1 to TN27 to which the value of the difference $\Delta\alpha\beta$ that is computed by the difference computation circuit 22 belongs, and detects the number of cycles $\gamma_1$ of the first driven gear 12 corresponding to the determined classification number. For example, in the case where the value of the difference $\Delta\alpha\beta$ that is computed by the difference computation circuit 22 is "−2160°", and the value of the difference $\Delta\alpha\beta$ belongs to the classification number TN7, and therefore the number of cycles $\gamma_1$ of the first driven gear 12 is "−6".

The absolute angle computation circuit 24 computes the absolute angle of the rotational angle $\theta$ of the main driving gear 11 based on the rotational angle $\alpha$ of the first driven gear 12 that is detected by the first magnetic sensor 17 and the number of cycles $\gamma_1$ of the first driven gear 12 that is computed by the rotation computation circuit 23. The rotational angle $\theta$ of the main driving gear 11 for multiple rotations exceeding 360° is calculated based on the following formula (2), for example.

$$\theta = m\alpha/z + (m/z)\Omega\gamma_1 \quad (2)$$

In the formula, "m" is the number of teeth of the first driven gear 12, "n" is the number of teeth of the second driven gear 13, and "z" is the number of teeth of the main driving gear 11. "$\Omega$" is the detection range of the first magnetic sensor 17 and the second magnetic sensor 18. "$\alpha$" is the rotational angle of the first driven gear 12 that is detected by the first magnetic sensor 17. "$m\alpha/z$" indicates the rotational angle of the main driving gear 11 with respect to the rotational angle $\alpha$ of the first driven gear 12 in the detection range $\Omega$ of the first magnetic sensor 17.

Figure 6:
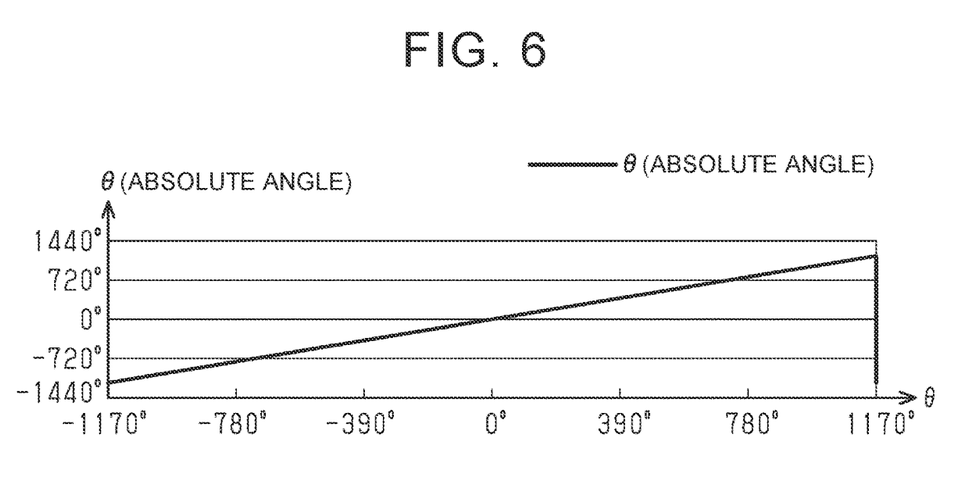
FIG. 6 is a graph indicating the relationship between the actual rotational angle of the main driving gear and the rotational angle (absolute value) of the main driving gear according to the embodiment.

The relationship between the actual rotational angle $\theta$ of the main driving gear 11 and the rotational angle $\theta$ (absolute angle) of the main driving gear 11 that is computed by the absolute angle computation circuit 24 is as indicated in the graph in FIG. 6. In the graph in FIG. 6, the horizontal axis indicates the actual rotational angle $\theta$ of the main driving gear 11, and the vertical axis indicates the rotational angle $\theta$ (absolute angle) of the main driving gear 11 that is computed by the absolute angle computation circuit 24. As indicated in the graph in FIG. 6, the rotational angle $\theta$ (absolute angle) of the main driving gear 11 is varied linearly along with variations in the actual rotational angle $\theta$ of the main driving gear 11. Since the actual rotational angle $\theta$ of the main driving gear 11 and the rotational angle $\theta$ (absolute angle) of the main driving gear 11 are proportional to each other, a one-to-one correspondence between the actual rotational angle $\theta$ of the main driving gear 11 and the rotational angle $\theta$ (absolute angle) of the main driving gear 11 is established. That is, the rotational angle $\theta$ (absolute angle) of the main driving gear 11, that is, the absolute rotational angle of the shaft 14, can be detected instantly.

The wear detection circuit 25 detects wear of the first driven gear 12 and the second driven gear 13 based on the value of the difference $\Delta\alpha\beta$ between the rotational angle $\alpha'$ and the rotational angle $\beta'$ after slope adjustment computed by the difference computation circuit 22. The wear detection circuit 25 determines that the first driven gear 12 and the second driven gear 13 are worn when the value of the difference $\Delta\alpha\beta$ is a value outside an allowable range determined with reference to an ideal value that is an ideal value of the difference $\Delta\alpha\beta$.

Figure 7:
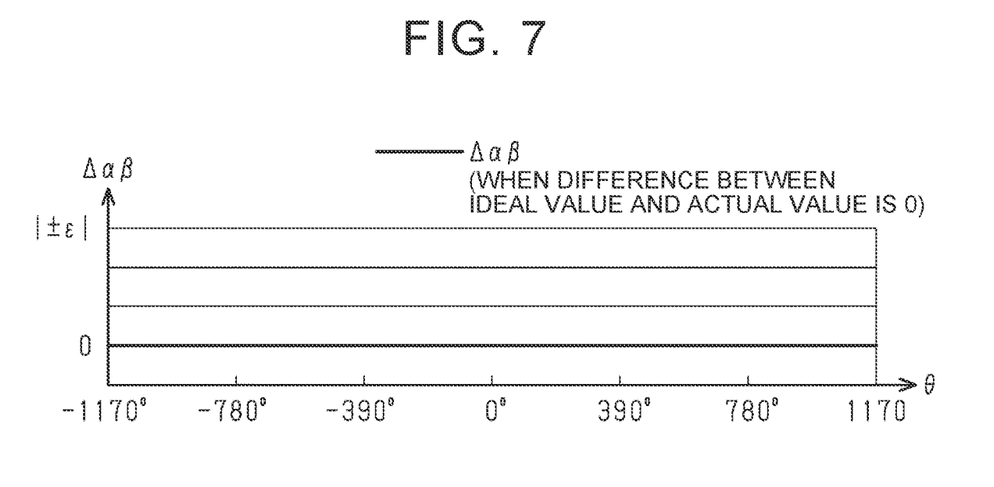
FIG. 7 is a graph indicating the allowable range of the difference between the rotational angle of the first driven gear after slope adjustment and the rotational angle of the second driven gear after slope adjustment according to the embodiment.

As indicated in the graph in FIG. 7, the allowable range of the difference $\Delta\alpha\beta$ is prescribed by an upper limit value $\varepsilon$ and a lower limit value $-\varepsilon$. The upper limit value $\varepsilon$ is set to a positive value with reference to "0" that is the ideal value of the difference $\Delta\alpha\beta$. The lower limit value $-\varepsilon$ is set to a negative value with reference to "0" that is the ideal value of the difference $\Delta\alpha\beta$. The upper limit value $\varepsilon$ and the lower limit value $-\varepsilon$ are set in accordance with the degree of wear allowed in accordance with the product specifications etc., and hence the precision in detecting the rotational angle $\theta$.

The wear detection circuit 25 determines that the first driven gear 12 and the second driven gear 13 are not worn when the value of the difference $\Delta\alpha\beta$ between the rotational angle $\alpha'$ of the first driven gear 12 and the rotational angle $\beta'$ of the second driven gear 13 after slope adjustment is a value within the range of "$\pm\varepsilon$" with respect to the ideal value of the difference $\Delta\alpha\beta$. The wear detection circuit 25 determines that the first driven gear 12 and the second driven gear 13 are worn when the value of the difference $\Delta\alpha\beta$ between the rotational angle $\alpha'$ of the first driven gear 12 and the rotational angle $\beta'$ of the second driven gear 13 after slope adjustment is a value outside the range of "$\pm\varepsilon$" with respect to the ideal value of the difference $\Delta\alpha\beta$.

The technical significance of detecting wear of the first driven gear 12 and the second driven gear 13 is as follows. That is, in the rotational angle detection device 10, the first driven gear 12 and the second driven gear 13 are meshed with the main driving gear 11. Therefore, in the case where the first driven gear 12 and the second driven gear 13 are worn, an error that corresponds to the degree of the wear of the first driven gear 12 and the second driven gear 13 is caused in the rotational angle α of the first driven gear 12 that is detected by the first magnetic sensor 17 and the rotational angle β of the second driven gear 13 that is detected by the second magnetic sensor 18. Thus, the rotational angle θ (absolute angle) of the main driving gear 11 that is computed based on the rotational angle α of the first driven gear 12 and the rotational angle β of the second driven gear 13 also has a value affected by an error due to the wear of the first driven gear 12 and the second driven gear 13. Therefore, it is preferable that wear of the first driven gear 12 and the second driven gear 13 be detected.

For example, in the case where wear of the first driven gear 12 and the second driven gear 13 is detected, it is possible to prompt taking some measures, such as repairing the rotational angle detection device 10, by reporting such wear. In the case where wear of the first driven gear 12 and the second driven gear 13 is detected, in addition, it is also possible to secure the reliability in detection by the rotational angle detection device 10 by suspending computation of the rotational angle θ of the main driving gear 11 or avoiding use of the computed rotational angle θ.

Thus, according to the present embodiment, the following effects can be obtained. Wear of the first driven gear 12 and the second driven gear 13 can be determined based on the value of the difference Δαβ between the rotational angle α' of the first driven gear 12 and the rotational angle β' of the second driven gear 13 after slope adjustment. This is for the following reason. That is, in the case where an error due to wear is caused in the rotational angle α of the first driven gear 12 and the rotational angle β of the second driven gear 13, an error that corresponds to the degree of wear of the first driven gear 12 and the second driven gear 13 is caused also in the rotational angles α' and β' after slope adjustment that are computed based on the rotational angles α and β, and hence the difference Δαβ between the rotational angle α' and the rotational angle β'. Thus, wear of the first driven gear 12 and the second driven gear 13 can be detected based on the value of the difference Δαβ between the rotational angle α' and the rotational angle β' after slope adjustment.

The wear detection circuit 25 determines that the first driven gear 12 and the second driven gear 13 are worn when the value of the difference Δαβ that is computed by the difference computation circuit 22 is a value outside an allowable range determined with reference to an ideal value of the difference Δαβ. Therefore, excessive determination of wear of the first driven gear 12 and the second driven gear 13 is suppressed. In the case where wear of the first driven gear 12 and the second driven gear 13 is determined simply based on a comparison between the value of the difference Δαβ and an ideal value thereof, the following concern arises. That is, the value of the difference Δαβ may be different from the ideal value because of the dimensional tolerance of the first driven gear 12 and the second driven gear 13, and wear of the first driven gear 12 and the second driven gear 13 may be determined even in such cases. In addition, it is also conceivable that the degree of the wear of the first driven gear 12 and the second driven gear 13 is allowable in accordance with the product specifications etc. Therefore, it is preferable that wear of the first driven gear 12 and the second driven gear 13 be determined based on whether or not the value of the difference Δαβ is a value within the allowable range that is determined with reference to the ideal value of the difference Δαβ.

As indicated in the graph in FIG. 5, the value of the difference Δαβ between the rotational angle α' of the first driven gear 12 and the rotational angle β' of the second driven gear 13 after slope adjustment is specific to the rotational angle θ of the main driving gear 11 for each cycle in which the rotational angles α' and β' after slope adjustment repeatedly rise and fall with respect to variations in the rotational angle θ of the main driving gear 11. Therefore, the value of the difference Δαβ is suitable for use to detect the number of cycles $\gamma_1$ of the first driven gear 12 or the number of cycles $\gamma_2$ of the second driven gear 13, and hence the rotational angle θ of the main driving gear 11. As indicated in the graph in FIG. 5, in addition, the value of the difference Δαβ varies in a form similar to a rectangular wave with respect to variations in the rotational angle θ of the main driving gear 11. Therefore, the wear detection circuit 25 can easily recognize the value of the difference Δαβ as a pattern, and hence can easily make a comparison between the value of the difference Δαβ and an ideal value thereof. Thus, the value of the difference Δαβ is suitable for use to detect wear of the first driven gear 12 and the second driven gear 13. The value of the difference between the rotational angles α and β before slope adjustment is varied linearly with respect to variations in the rotational angle θ of the main driving gear 11, for example.

The main driving gear 11, the first driven gear 12, and the second driven gear 13 are formed from a synthetic resin material. Therefore, the first driven gear 12 and the second driven gear 13 are easily worn, while generation of an abnormal sound during meshing of the gears can be suppressed. Thus, it is especially required to detect wear of the first driven gear 12 and the second driven gear 13.

There is no need to provide the rotational angle detection device 10 with a special component to detect wear of the first driven gear 12 and the second driven gear 13. Therefore, the configuration of the rotational angle detection device 10 is not complicated.

The present embodiment may also be implemented in the following modified forms. The main driving gear 11, the first driven gear 12, and the second driven gear 13 may be formed from a metal material. Also in this case, the first driven gear 12 and the second driven gear 13 are worn over years.

The rotation computation circuit 23 may compute the number of cycles $\gamma_2$ of the second driven gear 13 based on the difference Δαβ that is computed by the difference computation circuit 22. In this case, the table TB prescribes the relationship between the difference Δαβ and the number of cycles $\gamma_2$ of the second driven gear 13. In the case where the number of cycles $\gamma_2$ of the second driven gear 13 is computed by the rotation computation circuit 23, the absolute angle computation circuit 24 computes the absolute value of the rotational angle θ of the main driving gear 11 for multiple rotations exceeding 360° based on the rotational angle β of the second driven gear 13 that is detected by the second magnetic sensor 18 and the number of cycles $\gamma_2$ of the second driven gear 13 that is computed by the rotation computation circuit 23. Also in this manner, the rotational angle θ of the main driving gear 11, that is, the absolute rotational angle of the shaft 14, can be detected instantly.

The microcomputer 19 may be configured not to include the slope adjustment circuit 21. Wear of the first driven gear 12 and the second driven gear 13 can also be detected through a comparison between the value of the difference between the rotational angle α of the first driven gear 12 that is detected by the first magnetic sensor 17 and the rotational angle β of the second driven gear 13 that is detected by the second magnetic sensor 18 and the ideal value of the difference.

The rotational angle α of the first driven gear 12 and the rotational angle β of the second driven gear 13 may be computed by the microcomputer 19, specifically the absolute angle computation circuit 24. Examples of the shaft 14 include a steering shaft rotated in conjunction with an operation of a steering wheel, a pinion shaft that constitutes a rack-and-pinion mechanism, etc. in a steering device of a vehicle.

What is claimed is:

1. A rotational angle detection device comprising:
    a main driving gear configured to rotate together with a rotation detection target in an integrated manner;
    two driven gears that have different numbers of teeth and mesh with the main driving gear;
    two sensors configured to detect respective rotational angles of the two driven gears; and
    a computation circuit configured to compute a rotational angle of the main driving gear based on the respective rotational angles of the two driven gears that are detected through the two sensors, wherein
    the computation circuit includes a difference computation circuit and a wear detection circuit, the difference computation circuit being configured to compute a first difference, the first difference being a difference between the respective rotational angles of the two driven gears that are detected through the two sensors, the wear detection circuit being configured to detect wear of the two driven gears through a comparison between a value of the first difference that is computed by the difference computation circuit and a first ideal value, and the first ideal value being an ideal difference between the respective rotational angles of the two driven gears that are detected through the two sensors, and
    the computation circuit includes a slope adjustment circuit that adjusts a first slope and a second slope to have the same slope, the first slope being an proportion of an amount of variation in the rotational angle of one of the two driven gears with respect to an amount of variation in the rotational angle of the main driving gear, and the second slope being an proportion of an amount of variation in the rotational angle of the other of the two driven gears with respect to the amount of variation in the rotational angle of the main driving gear;
    the difference computation circuit is configured to compute a second difference, the second difference being a difference between the respective rotational angles of the two driven gears after slope adjustment by the slope adjustment circuit; and
    the wear detection circuit is configured to detect wear of the two driven gears through a comparison between a value of the second difference that is computed by the difference computation circuit and a second ideal value, the second ideal value being an ideal difference between the respective rotational angles of the two driven gears after the slope adjustment by the slope adjustment circuit.

2. The rotational angle detection device according to claim 1, wherein
    the wear detection circuit is configured to detect that the two driven gears are worn when the value of the first difference that is computed by the difference computation circuit is a value outside an allowable range determined with reference to the first ideal value.

3. The rotational angle detection device according to claim 1, wherein the main driving gear and the two driven gears are made of a synthetic resin.

4. The rotational angle detection device according to claim 1, wherein the rotation detection target is a steering shaft or a pinion shaft in a steering device of a vehicle.

* * * * *

UNITED STATES PATENT AND TRADEMARK OFFICE
CERTIFICATE OF CORRECTION

PATENT NO. : 11,187,556 B2  
APPLICATION NO. : 16/728695  
DATED : November 30, 2021  
INVENTOR(S) : Hiroshi Kichise Page 1 of 1

It is certified that error appears in the above-identified patent and that said Letters Patent is hereby corrected as shown below:

On the Title Page

For item (73) Assignee, "TOYOTA JIDOSHA KABUSHIKI KAISHA, Toyota (JP)" is replaced with --JTEKT CORPORATION, Osaka (JP)--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*